(12) United States Patent
Chatterjee et al.

(10) Patent No.: US 7,058,698 B2
(45) Date of Patent: Jun. 6, 2006

(54) CLIENT AWARE EXTENSIBLE MARKUP LANGUAGE CONTENT RETRIEVAL AND INTEGRATION IN A WIRELESS PORTAL SYSTEM

(75) Inventors: Amlan Chatterjee, Santa Clara, CA (US); Divya Jain, Santa Clara, CA (US); Thomas Mueller, Fremont, NE (US); Luu Tran, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 718 days.

(21) Appl. No.: 09/929,802

(22) Filed: Aug. 13, 2001

(65) Prior Publication Data

US 2003/0033377 A1 Feb. 13, 2003

(51) Int. Cl.
*G06F 15/167* (2006.01)

(52) U.S. Cl. ............ 709/218; 709/217; 709/219; 709/223; 455/555; 455/556.1; 455/41.2

(58) Field of Classification Search ............ 709/203, 709/217, 223, 224, 227, 219, 218, 248; 455/463; 379/67.1; 340/995.24; 380/258; 707/10; 705/40, 41
See application file for complete search history.

(56) References Cited

U.S. PATENT DOCUMENTS

| | | | |
|---|---|---|---|
| 6,363,419 B1 * | 3/2002 | Martin et al. ............ | 709/219 |
| 6,501,956 B1 * | 12/2002 | Weeren et al. ............ | 455/463 |
| 6,661,877 B1 * | 12/2003 | Lee et al. ............ | 379/67.1 |
| 6,721,747 B1 * | 4/2004 | Lipkin ............ | 707/10 |
| 6,798,358 B1 * | 9/2004 | Joyce et al. ............ | 340/995.24 |
| 2002/0065774 A1 * | 5/2002 | Young et al. ............ | 705/41 |
| 2002/0103935 A1 * | 8/2002 | Fishman et al. ............ | 709/246 |
| 2004/0213409 A1 * | 10/2004 | Murto et al. ............ | 380/258 |

OTHER PUBLICATIONS

"Wireless Application Protocols", Standard Groups/ Organizations, http://216.239.39.104/search?q=cache:9g7T0OI7ICUJ:cnscenter.future.co.kr/hot-topic/wap.html+wap+architecture+2001&hl=e.*

"Wireless Application Protocol—White Paper", Wireless Internet Today, Jun. 2000, http://www.wapforum.org/what/WAP_white_pages.pdf.*

"WAP Architecture" Version Jul. 12, 2001, Wireless Application Protocol Architecture Specification, http://cnscenter.future.co.kr/resource/hot-topic/wap/WAP-210-WAPArch-20010712-a.pdf.*

(Continued)

Primary Examiner—Jeffrey Pwu
(74) Attorney, Agent, or Firm—Osha Liang LLP

(57) ABSTRACT

In a wireless portal system having a wireless server, a client aware Extensible Markup Language (XML) content integration and transformation method and system. The client aware XML content integration and transformation system includes logic for identifying wireless client devices connecting to the wireless server by using particular characteristics of the client in presenting XML content formatted in response to connection requests from the client to the server. In one embodiment of the present invention, the client aware XML content transformation system receives an indication of a client type and uses this information to automatically search for XML content from a plurality of back-end resource servers on the Internet and transforms the content into a format suitable for delivery to the client. The means of formatting the XML content uses a style sheet such as an Extensible Style sheet Language (XSL) specific to the client type of the client requesting the XML content to transform the XML content into an appropriate markup to the client.

22 Claims, 6 Drawing Sheets

OTHER PUBLICATIONS

Supporting multi-device enabled Web services: challenges and open problems Kirda, E.; Kerer, C.; Jazayeri, M.; Kruegel, C.; Enabling Technologies: Infrastructure for Collaborative Enterprises, 2001. Wet Ice 2001. Proceedings. Tenth IEEE.*

* cited by examiner

CLIENT AWARE EXTENSIBLE MARKUP LANGUAGE CONTENT RETRIEVAL AND INTEGRATION IN A WIRELESS PORTAL SYSTEM

CROSS REFERENCE TO RELATED APPLICATION

This patent application is related to co-pending patent application Ser. No. 09/929,477, filed on Aug. 13, 2001, by Luu Tran et al., entitled "Client Aware Detection in a Wireless Portal System", which is hereby incorporated herein by reference in its entirety.

FIELD OF THE INVENTION

The present claimed invention relates generally to the field of wireless communication systems. More particularly, the present claimed invention relates to client aware Extensible Markup Language (XML) content retrieval and integration in a client independent wireless environment.

BACKGROUND ART

The Internet has become the dominant vehicle for data communications. The Internet is a vast collection of computing resources, interconnected as a network from sites around the world. And with the growth of Internet usage has come a corresponding growth in the usage of Internet devices, wireless devices and services.

The growing base of Internet users has become accustomed to readily accessing Internet-based services such e-mail, calendar or content at any time from any location. These services, however, have traditionally been accessible primarily through stationary PCs. However, demand is now building for easy access to these and other communication services for mobile devices.

As the demand for mobile and wireless devices increases, enterprises must rollout new communication capabilities beyond the reach of traditional wired devices, by extending the enterprise with extra-net applications, etc., to effectively and efficiently connect mobile employees with their home base. As the number of digital subscribers grows, traditional wireless providers must find applications suitable to the needs of these new mobile users.

However, service providers are not the only ones seeking applications to meet the growing service needs of wireless users. Traditional portal developers are also extending their traditional PC browser desk-top services to these new wireless markets.

With the growth of the wireless market comes a corresponding growth in wireless business opportunities, which in today's ever-growing markets means, there is a plethora of services available to customers of the enterprises that use these services. Many wireless service providers are now looking to add to basic core services by extending services such as e-mail, short messaging service notification, and other links to Internet Protocol (IP) based applications to drive additional business and revenues.

As the wireless market grows and Internet access becomes more mainstream and begins to move to new devices, wireless service providers are looking to develop highly leveraged Internet Protocol based applications on top of existing network infrastructure. To meet the growing demand for wireless client devices, enterprises need to provide access to any type of service from any type of device from anywhere and to provide content suitable for these devices without incurring substantial cost overhead.

The growth in wireless devices also means that traditional computer users who used to be tied to their desktop computers may now be mobile and would require remote access to network applications and services such as email. The mobility of wireless users presents a host of challenges to service providers who may have to provide traditional service to these new wireless devices. One such service is provided by Sun Microsystems, Inc., through its iPlanet™ platform to enable service providers to grow their services from basic traditional services such as voice to leading edge wireless applications with carrier-grade reliability and performance.

In addition to the traditional network applications that these new wireless users seek, the growth of the Internet and the introduction of new Internet enabled wireless devices have led to the explosive use of community-based web sites or portals. This growth in portals has created a need for wireless environments to provide portal support to handle the collection of data that relate to different topics such as news, stock quotes, applications and services required by wireless device users.

FIG. 1 depicts a prior art wireless client dependent based environment solution to handle similarly configured wireless client and provide the applications or portals required by these clients. The environment depicted in FIG. 1 includes wireless devices such as a Wireless Applications Protocol (WAP) phone 101, a wireless PC 102, a refrigerator 103, etc. In general, the wireless environment depicted in FIG. 1 is categorized into the network (Internet 104), Clients (e.g. mobile phone 101, PCs 102 and household appliances 103) and resources (e.g., web-sites 105, portals 106 and other applications 107).

For most of the wireless clients connected to the Internet 104, portals 106 offer the client the starting point of experiencing the Internet 104. Portals 106 are typically community-based web-sites that securely hold a collection of data related to different topics, including such applications as news, stock quotes, etc. For example, a wireless client connecting to the Internet will first login to a web portal site (e.g., yahoo) and from there browse through various sites to search for a host of different services.

The portals typically reside in a portal server which bundles an aggregation of services provided by an Internet service provider and provides these bundled services to wireless clients. A wireless portal server such as that developed by Sun Microsystems, Inc. provides such portal access to wireless application resources residing on resource servers A 108, B 109 and C 110.

The prior art wireless server depicted in FIG. 1 primarily supports the two major types of browsers known by most Internet users. These include the Microsoft Internet Browser and the Netscape Communicator Browser. These browsers are both HyperText Markup Language (HTML) based and suitable for some wireless devices, especially devices with large display screens.

Today, hundreds of software applications are being written for use on the Internet. And as computer programmers rush to provide software applications for use on the Internet, often in newly-developed programming languages written for the specific needs of the Internet, programmers also have to find a way to deliver content suitable to fit small wireless devices.

In the prior art system such as that depicted in FIG. 1, a wireless device user uses the Internet browser to make search requests and to see the search results of data accessed on the Internet. After the user has created a search request using the browser, a message is sent out to the Internet to carry out the request. The target of the request message is typically one of the interconnected computers in the Internet network. That computer will receive the message, attempt to find the data satisfying the user's request, format that data for display with the user's browser and return the formatted information to the browser software running on the user's device.

The data that is transferred between the target computer and the user's device is typically formatted using HTML. HTML is a standardized notation to display text and graphics in a computer display screen, as well as providing more complex information presentation such as animated video, sound, etc. In the prior art system depicted in FIG. 1, the browser expects incoming responses from search requests to the Internet to be in HTML format. Thus, the target server generates its response in this format. This creates a problem for programmers since any changes made to the HTML notation will require a similar change at the server level to support such changes.

To resolve such code change dependency, prior art system developers provided a solution depicted in FIG. 2. In the prior art system, client requests sent to server 210 via the Internet are formatted using HTML. The received requests are then formatted using a different formatting language such as XML for presentation to the client. XML is a standardized formatting language created for standardized document interchange on the Internet. XML is widely accepted in the Industry.

The process for formatting the HTML parsed data uses a style sheet in generating the requested data for the client computer 200. In the prior art system depicted in FIG. 2, an extensible style language (XSL) is used in formatting the data accessed from Databases on server 220 as an input stream to server 210. An XSL style sheet describes how XML information is to be presented as HTML. Using these two inputs, server 210 creates an HTML data stream to be sent back to the client computer 200.

The prior art solution depicted in FIG. 2 thus allows the wireless server to use HTML formatting of the client computer s request to server 210 and XML formatting of the response data transmitted to the client computer 200. Although the prior art solution handles the issue of having to update the server 210 code each time the HTML code is updated, the prior art request retrieval formatting and presentation formatting lack the ability to use other markup languages.

With the proliferation of different types and models of wireless devices that use a host of micro-browsers not programmed in HTML, the prior art solution of FIG. 2 fails to provide suitable data retrieval and presentation formatting to meet the display characteristics of these different types of devices.

A further drawback of the prior art is that since content request and delivery is always assumed to be from and to an HTML based system, content formatting and presentation lack the flexibility of customization and the unique identification and association of content to a particular wireless client. For example, a particular client (in a class of wireless devices with display characteristics different from other clients in the class) is unable to have data formatted to suit the unique display characteristics of the particular client. This is because the prior art uses the least common characteristics of the class to format data as representative of the class.

As the number of models of wireless clients increases, having restricted content and very limited information about client characteristics impairs the ability of service providers to take advantage of new wireless technologies and provide efficient and cost effective services. This also impairs the ability of the wireless client to enjoy the full richness and look and feel of user interfaces provided by the server.

SUMMARY OF INVENTION

Accordingly, to take advantage of the myriad of wireless applications and the numerous wireless clients being developed, a wireless server with extensibility capabilities to allow content requests from wireless clients to an external data-source to be formatted based on client type information is needed. Further, a need exists for a system and method of presentation formatting of content to be different from the formatting logic of the client's request to enable quick implementation of data gathered for presentation to the client. A need exists for "out-of-the-box" wireless client aware system solutions to allow technically unsophisticated end-users to connect to the wireless environment without unduly tasking the end-user's technical abilities. A need further exists for an improved and less costly device independent system, which improves efficiency and provides content to various wireless clients of different configurations without losing the embedded features designed for these devices.

What is described is a wireless portal system having a wireless server with a client aware Extensible Markup Language (XML) content integration and transformation method and system. The client aware XML content integration and transformation system includes logic for identifying client wireless devices connecting to the wireless server by using particular characteristics of the client in presenting XML content formatted in response to connection requests from the client to the server. In one embodiment of the present invention, the client aware XML content transformation system receives an indication of a client type and uses this information to automatically transforms the XML content from a plurality of back-end resource servers on the Internet into a format suitable for delivery to the client. In one embodiment, the XML content is formatted using a style sheet such as an Extensible Style sheet Language (XSL) specific to the client type of the client requesting the XML content to transform the XML content into an appropriate markup to the client.

Embodiments of the present invention are directed to a system and a method for wireless client aware content request formatting and presentation in a wireless network environment. In general, embodiments of the present invention vary the degree of handling client requests to a plurality of web-sites based on a plurality of wireless clients connecting to the wireless environment. The present invention implements client aware content request formatting to retrieve extensible markup language content form a data-source external to the wireless server or from a file-system on the server based on detailed client type information. In other words, the embodiments of the invention provide client specific content request formatting and presentation of content gathered from various back-end resources and presented in a wireless network environment. The invention is suitably adapted to function in a wireless portal environment.

Embodiments of the invention include an extensible markup language (XML) content request management solution designed to improve the handling of content requests from a variety of clients within a class of wireless clients for Internet content what is gathered from a variety of web-sites and integrated for presentation to a variety of differently configured wireless clients based on client type information specified by the client to a wireless server. The present invention allows for the intelligent formatting of Internet content gathered for dissimilar wireless clients using one or more Internet access protocols available to the wireless server and to format the data gathered into a coherently and cohesively formatted content into one or more markup language documents suitable for delivery to the requesting client.

To achieve the content request formatting and data presentation formatting of the present invention, embodiments provide a software-implemented process for use in a wireless network environment using a variety of markup languages to format data content uniquely identifiable to a particular wireless client for presentation to the client. In one embodiment of the present invention, a Wireless Markup Language (WML), a Compact Hyper-Text Markup Language (cHTML), etc., may be used to format content requests from the client to the wireless server. The wireless server may then use a sub-processing style sheet in formatting the XML data fetched and parsed in response to the client's request. For example, the style sheet may be an Extensible Style sheet Language (XSL).

Embodiments of the present invention receive a client request from a particular client from a class of wireless clients using an Internet based protocol such as Hyper Text Transport Protocol, NNTP, IMAP, etc., and a sub-process using the client request is used to retrieve requested data from a valid and wellformed XML source on the Internet or a file system residing on a wireless server. A sub-process is used for formatting the requested data for presentation to the requesting client. In this embodiment, the present invention associates the client to a valid XML data source with a client aware wireless portal system. The retrieved XML data is transformed using a style sheet such as an Extensible Style sheet Language (XSL) into an appropriate format such as a Hyper-Text Markup Language, a Wireless Markup Language or a host of other micro-browser base markups.

Embodiments of the present invention further comprise client type information provided by a client detection mechanism and stored in a client's "session" with the wireless server to transform and format the valid XML data fetched in response to client's request.

In one embodiment of the present invention a content formatter includes provider logic which generates Wireless Markup Language (WML) decks and other wireless adaptable languages based on the method invoked to provide content to a requesting client. The provider logic generates the correct Markup that is appropriate for the type of Wireless device requesting information based on pre-existing knowledge of the supported device type.

In another embodiment of the present invention, a content request formatting logic is responsible for transforming and formatting the generic back-end server content (i.e., XML) into appropriate markup language for delivery to the wireless clients. Service applications in the wireless server of the present invention know what transformation to invoke based on information embedded in the User Agent contained in the HTPP header from a client request and by locating the appropriate style sheet (e.g., an XSL style sheet).

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrates embodiments of the invention and, together with the description, serve to explain the principles of the invention.

Prior Art

Prior Art

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended Claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The invention is directed to a system, an architecture, subsystem and method to manage a wireless clients' extensible markup language content request formatting and presentation processes in a client independent wireless environment in a way superior to the prior art. In accordance with an aspect of the invention, a wireless server provides wireless client aware content request formatting processes and presentation formatting processes that enables client characteristics of devices to be used in determining the type of content to present by the wireless server.

In the following detailed description of the present invention, a system and method for a wireless Internet protocol based communication system are described. Numerous specific details are set forth in order to provide a thorough understanding of the present invention. However, it will be recognized by one skilled in the art that the present invention may be practiced without these specific details or with equivalents thereof.

Generally, an aspect of the invention encompasses providing an integrated wireless Internet server which provides a wide range of voice, data, video and other services to wireless clients which may connect to the wireless environment to be serviced alongside predefined wireless clients. The invention can be more fully described with reference to FIGS. 3 through 6.

Figure 1:
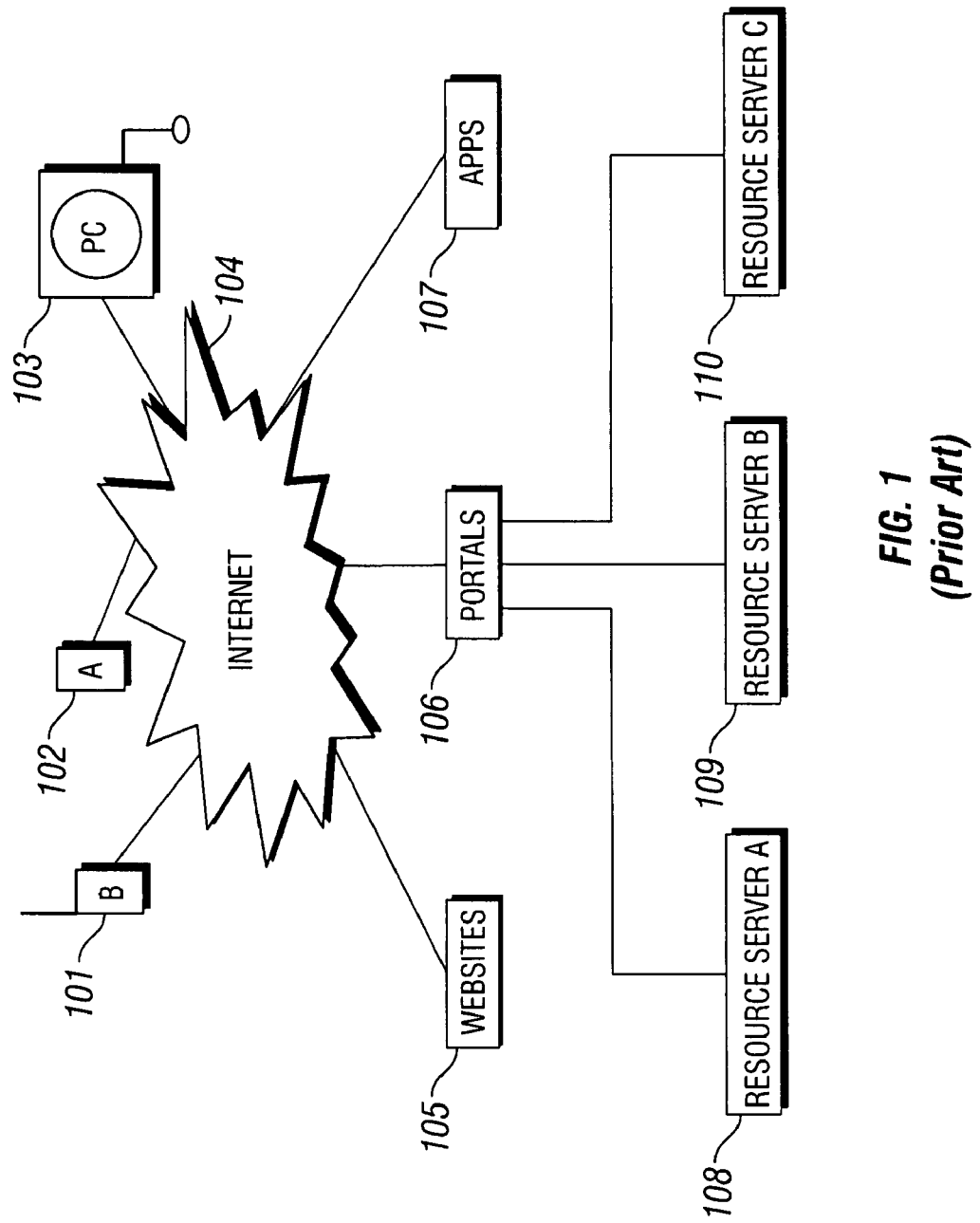
FIG. 1 is a block diagram of a conventional device dependent wireless system.
Figure 2:
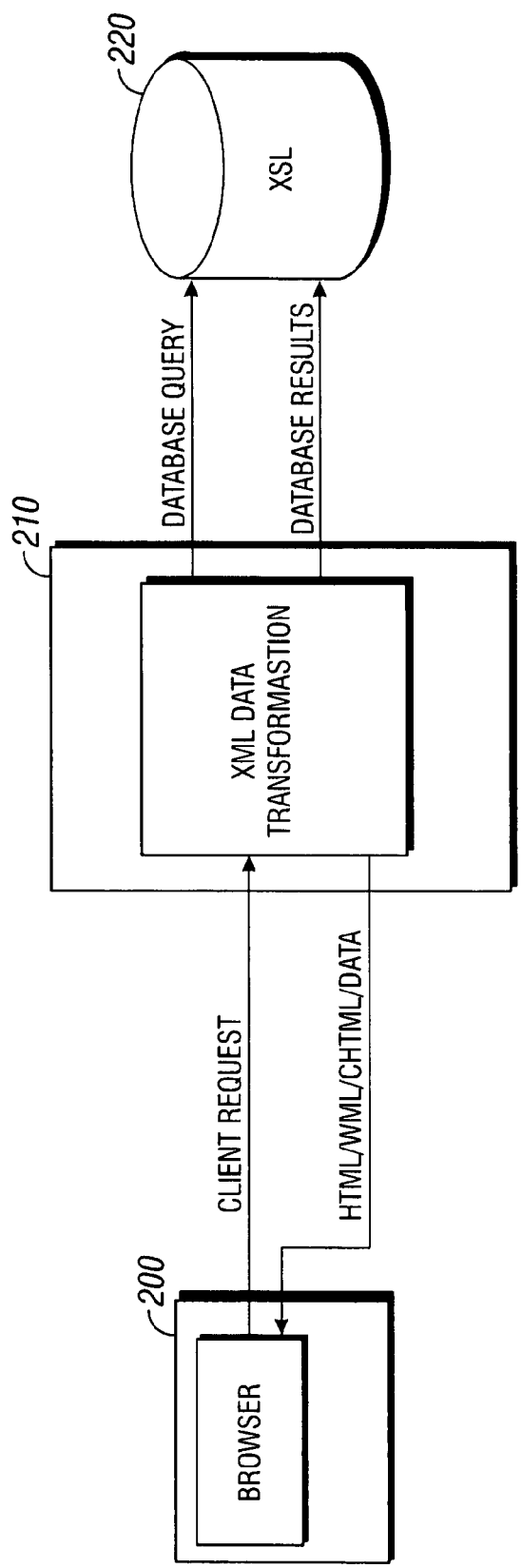
FIG. 2 is a block diagram of a conventional client-sever model for processing a client's request with a web browser in the prior art.
Figure 3:
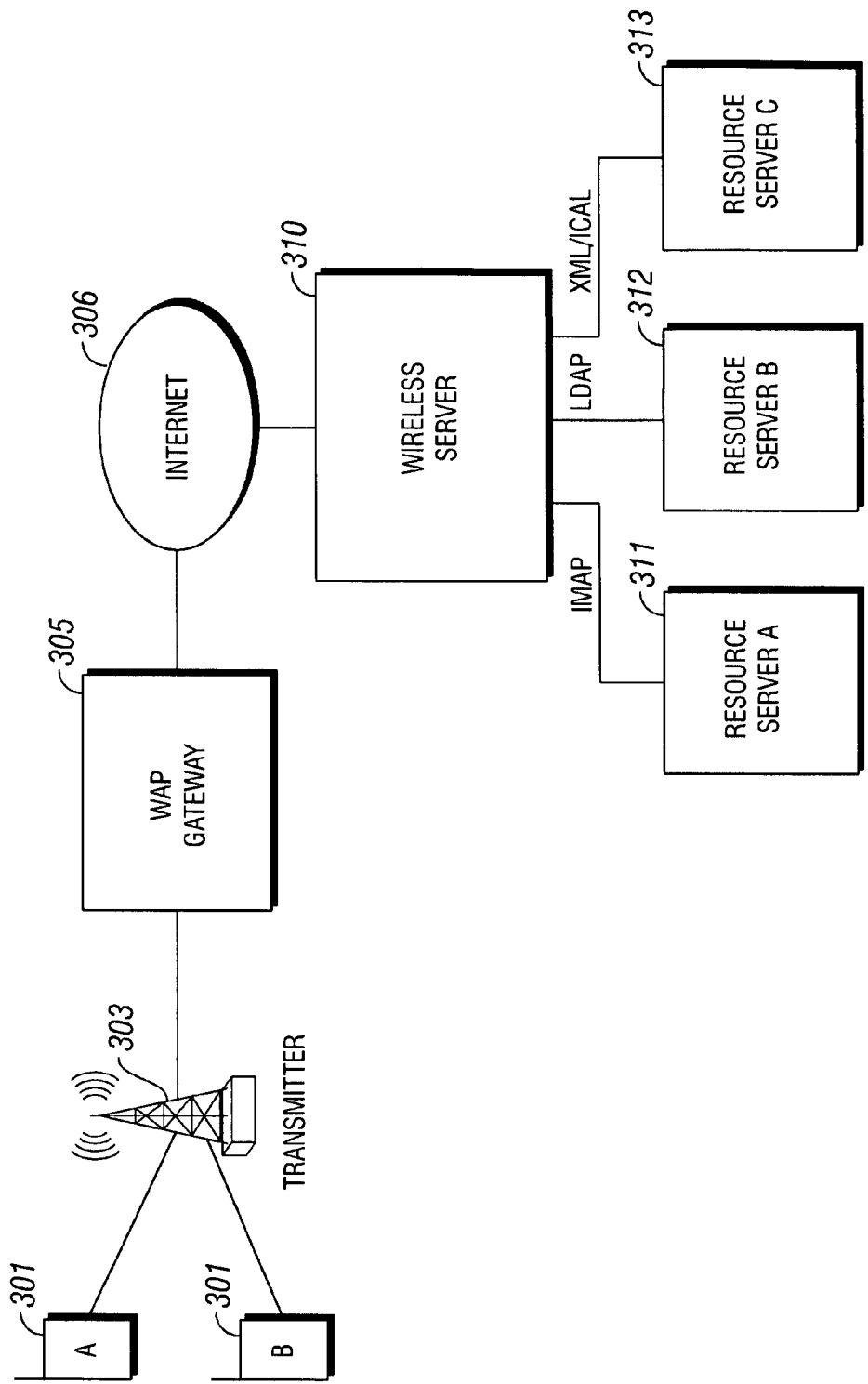
FIG. 3 is a block diagram of an implementation of a device independent wireless system of an embodiment of the present invention.

FIG. 3 depicts a wireless device independent based environment of the present invention. The wireless environment depicted in FIG. 3 comprises a wireless application protocol (WAP) based phone 301, a WAP transmission infrastructure 303, a WAP gateway 305, the Internet 306 and a wireless server 310. The WAP gateway 305 typically resides on the Local area network (LAN) within a telecom carrier premise. It is generally not a part of the wireless server 310. The WAP gateway 305 is responsible for converting the Wireless Markup Language (WML)/Hyper Text Transport Protocol (HTTP) content and protocol into a binary compressed, encoded, encrypted version of WML over WAP.

Conversely, the WAP gateway 305 also performs the translation of WAP commands into HTTP requests that can be sent over the public Internet 306. For example, in a GSM network, when a phone transmission is received by the mobile switching center, the gateway 305 distinguishes the transmission as a packet data and sends it to the proper channel to be processed. The WAP gateway 305 decompresses and decrypts the packets, as well as several other functions and formats the data into an HTTP request that is sent to the wireless server 310. The WAP gateway 305 can also store user's bookmarks, two of which could point to the wireless server's 310 messaging and other resource services. The wireless server 310 communicates Wireless Markup Language (WML) over HTTP on the front-end and communicates in native protocol of the target server on the back-end.

The wireless server 310 communicates to these back-end resources servers using the backend server's native protocol. For example, the wireless server may communicate to resource server A 311 which may be a messaging server using IMAP. Lightweight Directory Access Protocol (LDAP) is used for all communications to and from the resource server B 312. And an Extensible Markup Language (XML) protocol may be used to communicate with resource server C 313.

Although the wireless server 310 depicted in FIG. 3 is capable of communicating in these native protocols shown in FIG. 3, the wireless server's 310 protocol handling capability can be extended to support a variety of other protocols. The wireless server 310 implements the WML interface and generates the corresponding WML content based on what it receives from the back-end server. The wireless server 310 also processes incoming HTTP requests in which a wireless device sending data or a request to the back-end servers. The wireless environment depicted in FIG. 3 typically supports wireless devices of dissimilar configuration and is thus device independent.

Figure 4:
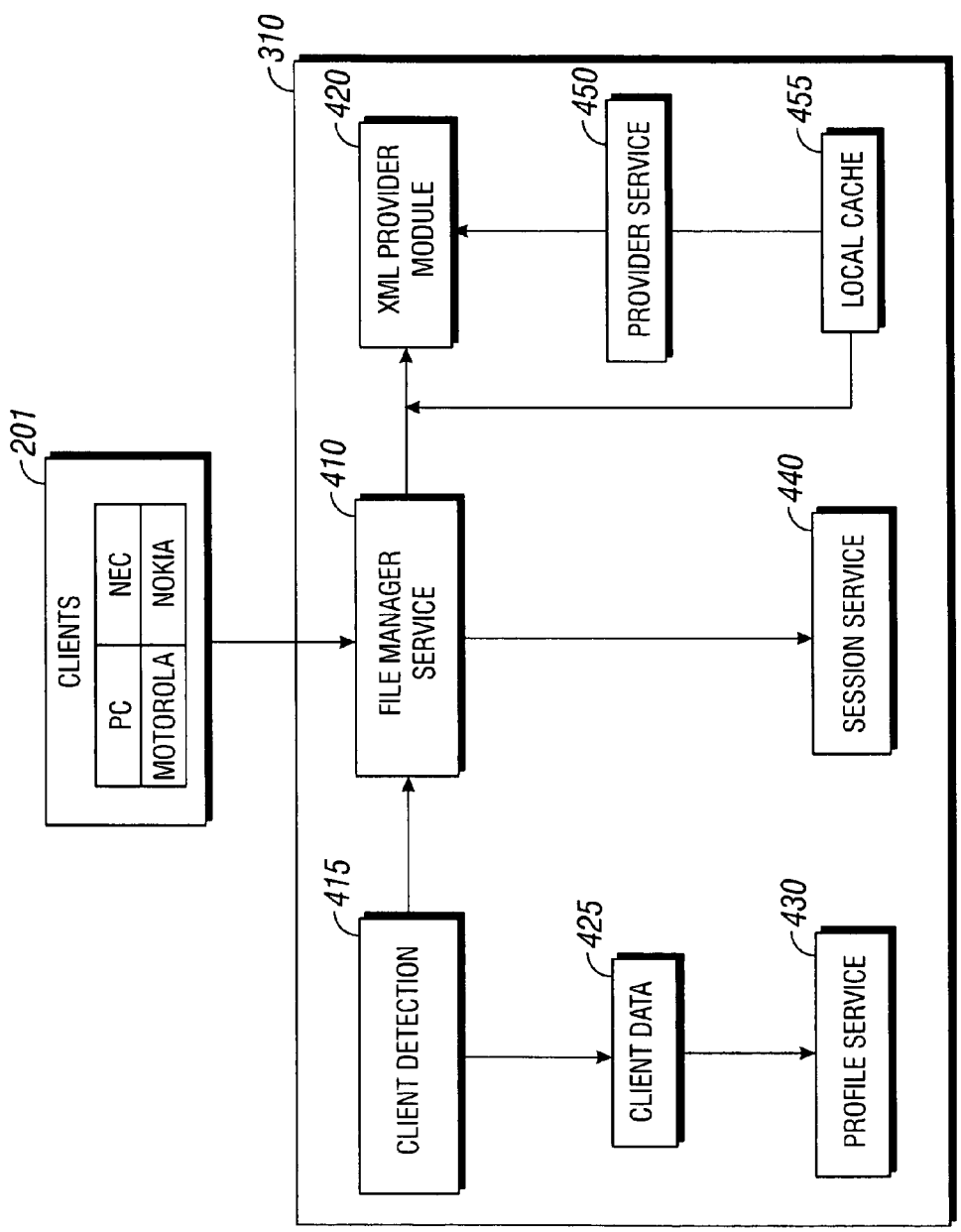
FIG. 4 is a block diagram of an exemplary internal architecture of the wireless server of FIG. 3.

FIG. 4 is a block diagram illustration of one embodiment of the wireless server of the present invention. Wireless Server 310 (WS) comprises, Content File Manager Service module 410, Client Detection module 415, XMLProvider module 420, Profile Service 430, Session Service (SS) module 440, Client Data module 425, Provider Service (PS) 450 and Local Cache 455.

The wireless server depicted in FIG. 4 is a flexible, scalable, extensible and capable of supporting a rich evolving range of networks such as Global System for Mobile communication (GSM) Networks, Code Division Multiple Access (CDMA) Networks, Time Division Multiple Access (TDMA) Networks, Third Generation (3G) Networks and others.

The architecture of the server is also capable of handling a variety of wireless environments and markup languages such as the wireless markup language (WML), the handheld device markup language (HDML) and the hypertext markup language (HTML). The server 310 is capable of providing support for multiple devices and is easily adaptable and extensible to additional devices and markup languages.

In the preferred embodiment, embodiments of the present invention may be implemented as one or more computer software programs. These programs will be used where software applications retrieve data in response to a user's request. The software programs may also perform some type of processing on the retrieved data and to format the data that is to be returned to the user for display. According to the present invention, one program retrieves data, another transforms the retrieved data and yet another program formats the transformed data. The programs typically execute on wireless server 310, which provides services in response to requests from wireless clients using a web browser connected to the Internet.

Still referring to FIG. 4, XMLProvider module 420 is coupled to provide a client with the XML content to a user's homepage and navigation links to other providers in the server 310. XMLProvider module 420 enables the integration of all services that can produce valid XML content, with the wireless server 310. The XMLProvider module 420 resolves the client type using client data module 415 and generates appropriate content via device specific XSL transformation. XMLProvider module 420 also fetches XML content from a http(s) source.

In one embodiment of the present invention, XMLProvider module 420 has the capability to handle file urls to an XML file, so the service provider can specify a local XML source or a file system. The service provider provides the required client specific XSL template stored in File Manager Service 410 and required for transforming the XML file. The transformed XML file is then placed in a specific directory in File Manager Service 410 for device dependent data files. An example of how an end-user can select content using the Provider Service 450 is described in co-pending U.S. patent application titled "Client Aware Content Selection and Retrieval in a Wireless Portal System", Ser. No.:09/929,654, assigned to the assignee of the present invention and hereby incorporated by reference herein.

XMLProvider 420 also provides a way of creating a channel on a client aware desktop with any valid XML source and an XSL template to transform the channel to markup languages specifically suitable to the client. This enables the client aware content representation on a client aware desktop from a pure XML data source. Thus, non XML channels can co-exist with XML channels on the desktop so long as they have the same markup representation for the specific client type.

In one embodiment of the present invention, when XMLProvider module 420 is invoked, XMLProvider 420 uses the Client Data Module 425 to find out the client type and then determine if it can be serviced based on template availability in File Manager Service 410. Once it is determined that the XMLProvider module 420 can be served content to the channel, XMLProvider 420 generates appropriate content by transforming the XML source data using the supplied XSL template and the reference implementation. This resulting information is then sent to the channel on the client's desktop.

Also depicted in FIG. 4 is Local Cache 455 which is coupled to XMLProvider module 420 to store class information to assist XMLProvider 420 in transforming XML documents retrieved in response to the client's request.

While the embodiment of the present invention as depicted in FIG. 4 has been described as functional structured logic in single modules, the teachings contemplated by the present invention can be alternatively achieved by implementing the data retrieval, transformation and formatting in a single logic module without deviating from the scope of the present invention.

Figure 5:
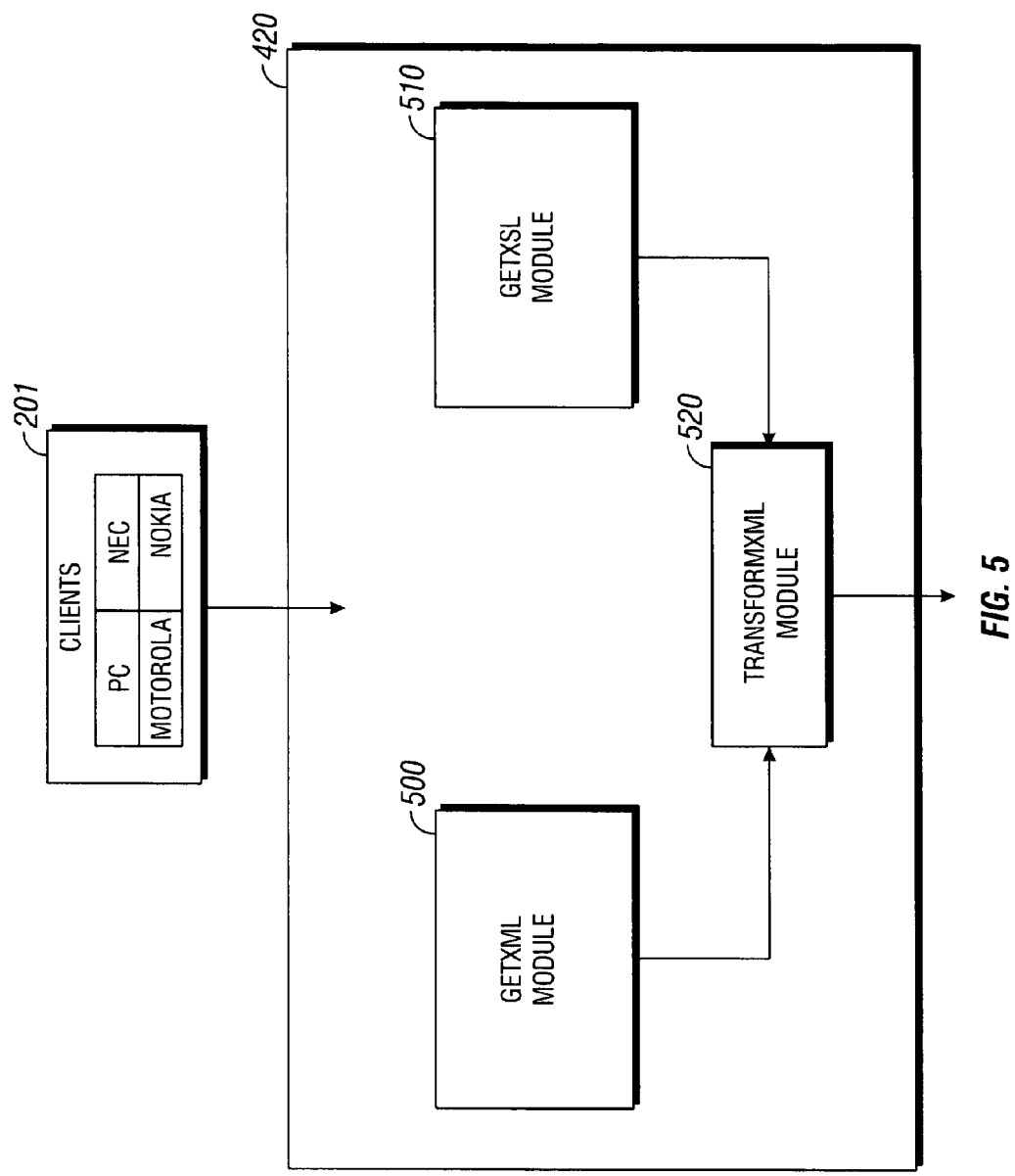
FIG. 5 is a block diagram of an embodiment of the functional units of the XMLProvider Module in accordance with an embodiment of the present invention.

Reference is now made to FIG. 5 which illustrates one embodiment of the logical partitioning of the functional units of XMLProvider 420. As shown in FIG. 5, XMLProvider 420 comprises GETXML module 500, GETXSL module 510 and TransformXML module 520.

Client search request reaches XMLProvider 420 which is capable of fulfilling the search request. The client search request is initially processed by GETXML module 500 which fetches XML data from a XML data source in response to the client's request. GETXML module 500 retrieves the value of XMLProvider profile attribute for specifying the location of the XML document file.

The nature and name of the XML document source (e.g., HTTP(s) or file url) is found in the attribute value. In the present invention, the value of the XMLProvider attribute in url may be a file or a file path name e.g., http://abc.com/servlet/xml.toc; https://abc.com/xml/toc, or a file url file:/export/home/mydir/toc or Toc. GETXML 500 also retrieves the client type information from client detection logic 415 and with the location information of the requested file fetches the corresponding XML document to transform into the appropriate content to the client.

GETXSL 510 retrieves client specific XSL templates that may reside in File Manager module 410 to aid in transforming XML documents fetched from the XML source. GETXSL module 510 retrieves the XSL templates that describe the details of how the XML document is to be transformed. In the present invention, the XSL template can be retrieved as a file lookup based on the requesting client type from files residing in the file manager module 410. In other instances, an absolute file path from the XSL file can be specified by the client to retrieve the appropriate XSL file to aid with the transformation of the XML document.

The XML document fetched together with the corresponding XSL template file is presented to the TransformXML module 520 to be transformed into the appropriate markup to the client. In the present invention, the TransformXML module 520 is loaded with the classes transforming the XML content into client specific markup language as dictated by client specific XSL. This provides a way for the service provider to use a single XML document to be presented to many different devices in a client aware or device specific fashion.

Figure 6:
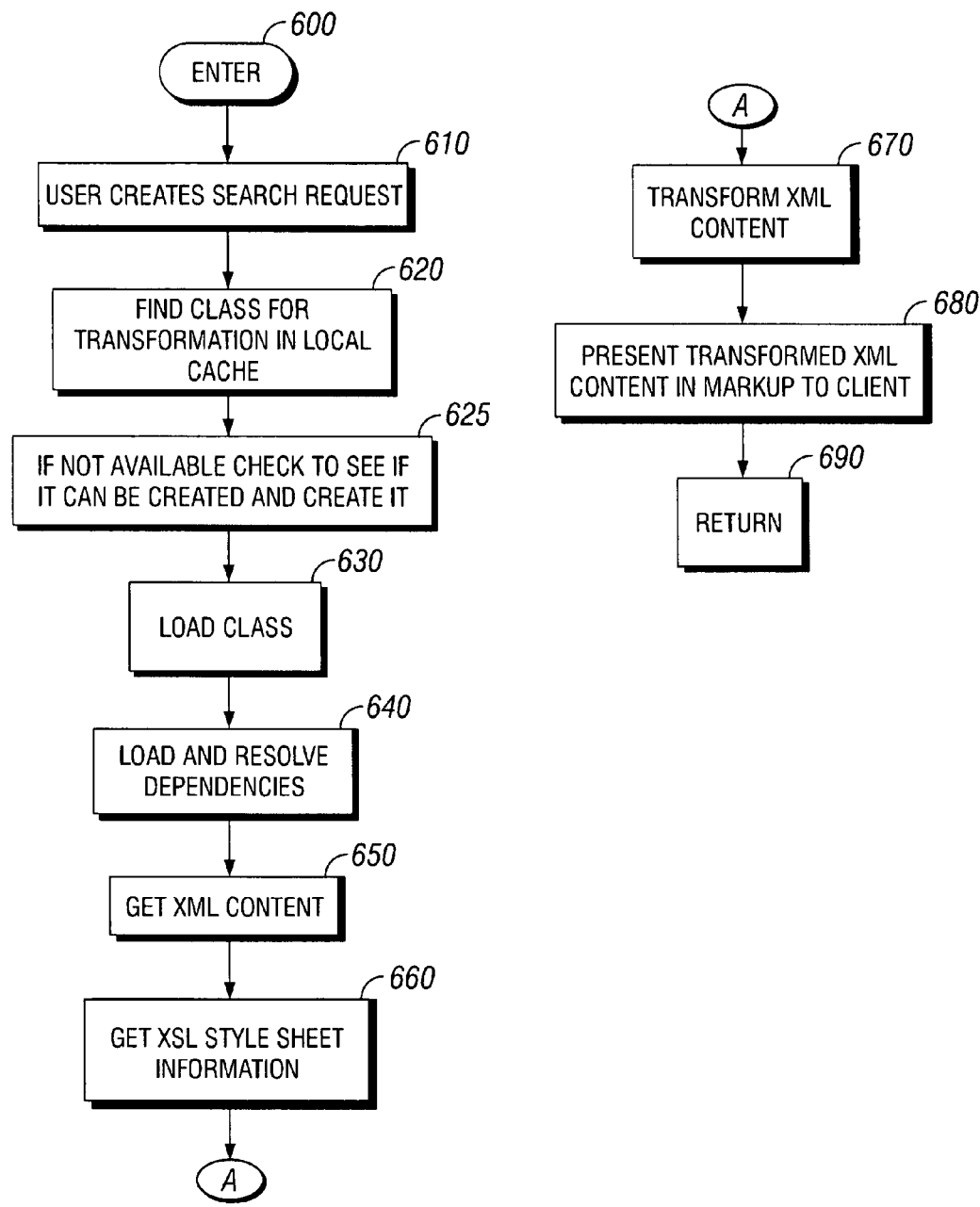
FIG. 6 is a flow diagram of one embodiment of the XML data fetching and transformation processes of the XMLProvider Module in accordance with one embodiment of the present invention.

FIG. 6 illustrates flow diagrams of the logical steps performed in transforming XML documents retrieved in response to client's request to the wireless server 310 in accordance with the present invention.

The computer implemented process 600 begins at Step 610 when the client issues a search request using the client's browser software. Upon receiving the client's request, XMLProvider 420, at Steps 620 through 640, searches for the appropriate transformation class in local cache and loads the class dependencies and checks if it can process the type of client.

At Step 650, XMLProvider 420 invokes the getXML method to retrieve XML document in response to the client's request using the client type information provided by the client. While retrieving the XML content, XMLProvider 420 also retrieves the appropriate XSL style sheet information at Step 660 to help translate the retrieved XML document.

At Step 670, XMLProvider 420 transforms the retrieved XML document into the appropriate markup based on the client type information provided by the client detection module 415 for presentation to the client, at Step 680. According to an embodiment of the present invention the retrieved XML document may be formatted into an HTML, WML, HDML, or other markups suitable for interacting with the client's browser for display to he client.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A wireless server system comprising:
   an applications content locating module for locating a first wireless applications content over multiple back-end resource servers based on a type of wireless client;
   an applications content transformation service configured to dynamically present transformed content in a format suitable to said wireless client based on said type of the wireless client; and
   an applications content translating module coupled to said applications content locating module configured to provide client specific templates, wherein the client specific templates are used to transform said first wireless applications content and wherein each of the plurality of client specific templates is associated with at least one type of wireless client,
   wherein said first wireless application content is compliant with Extensible Markup Language (XML) content, and
   wherein said client specific templates are compliant with Extensible Style sheet Language (XSL).

2. The wireless server system of claim 1, further comprising an automatic client detection service for automatically detecting and providing information corresponding to said type of said wireless client wherein the information is used by said content locating module to determine the appropriate client specific templates to use to transform said first wireless application content.

3. The wireless server system of claim 2, wherein a service request issued by said wireless client is used to determine the type of content to be delivered to said wireless client.

4. The wireless server system of claim 1, further comprising pre-stored class information for enabling said application content transformation service to transform said first wireless application content into a format suitable for presentation to said wireless client.

5. The wireless server system of claim 1, wherein said particular wireless client is a handheld device.

6. The wireless server system of claim 1, wherein said particular wireless client is a wireless phone.

7. The wireless server system of claim 1, wherein said particular wireless client is a wireless personal computer system.

8. A client aware Extensible Markup Language (XML) content integrator in a wireless network, comprising:
- a wireless server;
- a plurality of classes of wireless clients, each of said classes of wireless clients comprising unique identification parameters;
- a client aware Extensible Markup Language (XML) content provider for retrieving XML data from a source external to said wireless server in response to a particular client type content access request from one of said plurality of classes of wireless clients; and
- client aware XML content translation templates, each of said XML content translation templates specific to a client type of said wireless client plurality of classes of wireless clients,
- wherein said XML content translation templates are compliant with Extensible Style sheet Language (XSL) templates.

9. The client aware XML content integrator of claim 8, further comprising XML transformation logic for transforming said XML content using said XML content translation templates.

10. The client aware content integrator of claim 8, wherein said client aware XML content provider is extensible to dynamically alter transformation data provided to said client aware XML content provider.

11. The client aware content integrator of claim 8, wherein said client aware XML content is transformed using said XSL templates to a markup language content suitable for presentation to said particular client.

12. A wireless server, comprising:
- a client aware Extensible Markup Language (XML) content integration and transformation provider for providing XML content gathered from a plurality of locations in a markup format to a wireless client coupled to the wireless server wherein the XML content provided to said wireless client is formatted based on a wireless client type of said wireless client; and
- a local storage unit for storing transient data used while transforming said XML content by said client aware XML content integration and transformation provider,
- wherein said client aware XML content integration and transformation provider further comprises a plurality of client aware Extensible Style sheet Language (XSL) templates for providing client specific content translation information for transforming said XML content into a markup format based on the wireless client type.

13. The wireless server of claim 12, wherein said client aware XML content integration and transformation provider comprises a client aware XML content retrieving unit for retrieving XML content from data sources that are external and internal to said wireless server.

14. The wireless server of claim 13, wherein said XML content integration and transformation provider further comprises an XML content transformation unit for transforming said XML content into a client specific markup content.

15. The wireless server of claim 14, wherein said markup content is compliant with Hyper Text Markup Language content.

16. The wireless server of claim 14, wherein said markup content is compliant with Wireless Markup Language content.

17. The wireless server of claim 14, wherein said markup content is compliant with Handheld Device Markup Language content.

18. The wireless server of claim 14, wherein said markup content comprises a markup content suitably adapted to interact with a Internet browser of said wireless client.

19. The wireless server of claim 18, wherein said XML content integration and transformation provider further comprises availability logic for determining whether content selected by said wireless client is available for presentation to said client.

20. A method for providing Extensible Markup Language (XML) content from a wireless server to a wireless client connected to said wireless server, said method comprising the steps of:
- receiving a client request by said wireless server from said wireless client, said client request comprising client type information associated with said wireless client;
- retrieving style sheet information specific to said wireless client, based on said client type information, for transforming said XML content;
- retrieving XML content in response to said client request from data sources external and internal to said wireless server; and
- transforming said retrieved XML content into appropriate content suitable for an underlying markup language of an Internet browser used by said wireless client using said style sheet,
- wherein said style sheet is compliant with Extensible Style sheet Language (XSL).

21. The method of claim 20, wherein said transforming step comprises the step of loading a class of transformation parameters suitable for transforming said retrieved XML content in a manner based on the client type information of said wireless client.

22. The method of claim of 20, wherein said external data source comprises resource servers coupled to the Internet.

* * * * *